US011074709B2

(12) United States Patent
Li et al.

(10) Patent No.: US 11,074,709 B2
(45) Date of Patent: Jul. 27, 2021

(54) IMAGE-BASED POSITION DETECTION METHOD, IMAGE BASED POSITION DETECTION APPARATUS, DEVICE AND STORAGE MEDIUM

(71) Applicant: BAIDU ONLINE NETWORK TECHNOLOGY (BEIJING) CO., LTD., Beijing (CN)

(72) Inventors: Xubin Li, Beijing (CN); Jian Wang, Beijing (CN); Shilei Wen, Beijing (CN); Errui Ding, Beijing (CN); Hao Sun, Beijing (CN); Le Kang, Sunnyvale, CA (US); Yingze Bao, Sunnyvale, CA (US); Mingyu Chen, Beijing (CN); Zhizhen Chi, Beijing (CN); Zeyu Liu, Beijing (CN); Chengyue Zhang, Beijing (CN)

(73) Assignee: BAIDU ONLINE NETWORK TECHNOLOGY (BEIJING) CO., LTD.

( * ) Notice: Subject to any disclaimer, the term of this patent is extended or adjusted under 35 U.S.C. 154(b) by 50 days.

(21) Appl. No.: 16/454,910

(22) Filed: Jun. 27, 2019

(65) Prior Publication Data

US 2019/0318499 A1 Oct. 17, 2019

(30) Foreign Application Priority Data

Jul. 3, 2018 (CN) ......................... 201810717769.3

(51) Int. Cl.
*G06T 7/70* (2017.01)

(52) U.S. Cl.
CPC ...... *G06T 7/70* (2017.01); *G06T 2207/10028* (2013.01); *G06T 2207/30196* (2013.01)

(58) Field of Classification Search
CPC ............. G06T 7/70; G06T 2207/10028; G06T 2207/30196; G06T 7/254; G06T 7/55; G06T 2207/10004
See application file for complete search history.

(56) References Cited

U.S. PATENT DOCUMENTS 9,109,886 B1 8/2015 Haskin et al.
10,699,421 B1 * 6/2020 Cherevatsky .......... H04N 7/181
(Continued)

FOREIGN PATENT DOCUMENTS

CN 107945282 A 4/2018
CN 108053469 A 5/2018
(Continued)

OTHER PUBLICATIONS

Wandi Susanto et al., 3D Object Detection with Multiple Kinects, Oct. 7, 2012, Computer Vision EcCCV 2012, Norkshops and Demonstrations, Springer Berlin Heidelberg, pp. 93-102.
(Continued)

*Primary Examiner* — Phuoc Tran
(74) *Attorney, Agent, or Firm* — Dilworth IP, LLC

(57) ABSTRACT

Embodiments of the present application provide an image-based position detection method, an apparatus, a device and a storage medium. Images captured at the same time by a plurality of photographing devices mounted in different orientations are acquired, where the plurality of photographing devices are synchronous in time; a two-dimensional position of a target object in each of the images is detected; and a three-dimensional position of the target object in an actual space is determined based on the two-dimensional position of the target object in each of the images and internal parameters and external parameters of the plurality of photographing devices. The embodiments of the present application implement a three-dimensional positioning solu-
(Continued)

Acquiring images captured at a same time by a plurality of photographing devices mounted in different orientations, where the plurality of photographing devices are synchronous in time — S11

↓

Detecting two-dimensional position of a target object in each of the images — S12

↓

Determining a three-dimensional position of the target object in an actual space based on the two-dimensional position of the target object in each of the images and an internal parameter and an external parameter of the plurality of photographing devices — S13 tion based on a plurality of cameras, thereby improving the reliability and accuracy of object positioning.

15 Claims, 3 Drawing Sheets

(56) References Cited

U.S. PATENT DOCUMENTS

| | | | | |
|---|---|---|---|---|
| 10,755,428 | B2 * | 8/2020 | Aswin | G06K 9/6211 |
| 2013/0162643 | A1 | 6/2013 | Carole | |
| 2014/0177915 | A1 * | 6/2014 | Fan | G06T 7/174 382/103 |

FOREIGN PATENT DOCUMENTS

| | | | |
|---|---|---|---|
| EP | 3093822 | A1 | 11/2016 |
| JP | 2012057974 | A | 3/2012 |
| JP | 2012068937 | A | 4/2012 |
| JP | 2013083505 | A | 5/2013 |
| JP | 2016001181 | A | 1/2016 |
| JP | 2018077196 | | 5/2018 |
| WO | 2018101080 | A1 | 10/2019 |

OTHER PUBLICATIONS

Lucia Maddalena et al., Background Subtraction for Moving Object Detection in RGBD Data: A Survey, Journal of Imaging, vol. 4, No. 5, May 16, 2018, pp. 1-27.

Dib, Abdallah et al., Pose estimation fora partially observable human body from RGB-D cameras, 2015 IEEE/RSJ International Conference on Intelligent Robots and Systems (IROS), IEEE, Sep. 28, 2015, pp. 4915-4922.

Michael Zollhoefer et al., State of the Art on 3D Reconstruction with RGB-D Cameras, Computer Graphics Forum, vol. 37, No. 2, May 1, 2018, pp. 625-652.

Felzenszwalb, p. F et al., Object Detection with Discriminatively Trained Part-Based Models, IEEE Transaction on Patern Analysis and Machine Intelligence, IEEE Computer Society, USA, vol. 32, No. 9, Sep. 1, 2010, pp. 1627-1645.

Extended European Search Report issued in European Application No. EP19183921 dated Dec. 2, 2019.

Office Action issued in Chinese Patent Application No. 201810717769.3 dated Dec. 18, 2019.

Susanto, W. et al., 3D Object Detection with Multiple Kinects, Springer-Verlag Berlin Heidelberg, 2012, pp. 93-102.

First Office Action in JP Patent Application No. 2019123629 dated Aug. 13, 2020.

* cited by examiner

IMAGE-BASED POSITION DETECTION METHOD, IMAGE BASED POSITION DETECTION APPARATUS, DEVICE AND STORAGE MEDIUM

CROSS-REFERENCE TO RELATED APPLICATION

This application claims priority to Chinese Patent Application No. 201810717769.3, filed on Jul. 3, 2018, which is hereby incorporated by reference in its entirety.

TECHNICAL FIELD

Embodiments of the present application relate to the field of artificial intelligence technologies, and in particular, to an image-based position detection method, an image-based position detection apparatus, a device and a storage medium.

BACKGROUND

With the advancement of social intelligence, unmanned supermarkets have been widely concerned as a new retail method. At present, the related technologies of the unmanned supermarkets are still immature, especially how to judge the positions of customers and keep track of the positions through a plurality of cameras is a difficult problem.

At present, an image-based positioning method is mainly based on images taken by a single camera. A two-dimensional position of a target object is detected and acquired by a pre-trained detection model from an image, and the position of the object is located based on the two-dimensional position. However, the position cannot be located or the location is inaccurate when the target object is shielded or the two-dimensional position of the target object detected in the image is inaccurate.

SUMMARY

Embodiments of the present application provide an image-based position detection method, an image-based position detection apparatus, a device and a storage medium, to achieve a three-dimensional positioning solution based on a plurality of cameras, and improve the reliability and accuracy of object positioning.

A first aspect of an embodiment of the present application provides an image-based position detection method, including: acquiring images captured at a same time by a plurality of photographing devices mounted in different orientations, where the plurality of photographing devices are synchronous in time; detecting a two-dimensional position of a target object in each of the images; and determining a three-dimensional position of the target object in an actual space based on the two-dimensional position of the target object in each of the images and internal parameters and external parameters of the plurality of photographing devices.

A second aspect of an embodiment of the present application provides an image-based position detection apparatus, including: a first acquiring module, configured to acquire images captured at a same time by a plurality of photographing devices mounted in different orientations, where the plurality of photographing devices are synchronous in time; a detecting module, configured to detect a two-dimensional position of a target object in each of the images; and a determining module, configured to determine a three-dimensional position of the target object in an actual space based on the two-dimensional position of the target object in each of the images and internal parameters and external parameters of the plurality of photographing devices.

A third aspect of an embodiment of the present application provides a computer device, including: one or more processors; a storage apparatus, configure to store one or more programs where the one or more programs, when executed by the one or more processors, cause the one or more processors to implement the method according the first aspect.

A fourth aspect of an embodiment of the present application provides a computer readable storage medium, having a computer program stored thereon, where the program, when executed by a processor, implements the method according to the first aspect.

Based on the above each aspects, in the embodiments of the present application, acquires images captured at the same time by a plurality of photographing devices mounted in different orientations, detects a two-dimensional position of a target object in each of the images, and determines a three-dimensional position of the target object in an actual space based on the two-dimensional position of the target object in each of the images and internal parameters and external parameters of the plurality of photographing devices. Since the embodiments of the present application determines the three-dimensional position of the target object in the actual space by combining the two-dimensional positions of the target object in a plurality of images, even if the target object is shielded by other objects in a certain image, an accurate three-dimensional position can still be obtained according to its two-dimensional positions in the other images. Moreover, the method for determining the three-dimensional position based in a plurality of images can also avoid the problem of inaccurate location of the three-dimensional position caused by inaccurate identification of a two-dimensional position in a single image, thereby improving the accuracy and reliability of the positioning of the object.

It should be understood that the content described in the summary is not intended to limit the key or important features of embodiments of the present application, nor is it intended to limit the scope of the present application. Other features of the present application will be easily understood through the following description.

BRIEF DESCRIPTION OF DRAWING(S)

DESCRIPTION OF EMBODIMENTS

Figure 1:
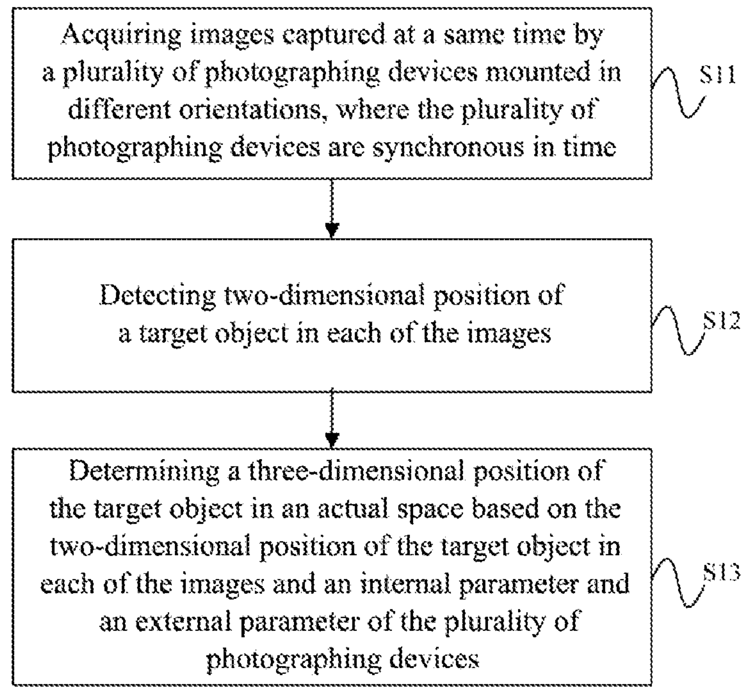
FIG. 1 is a flowchart of an image-based position detection method according to an embodiment of the present application.

Embodiments of the present application will be described in more detail below with reference to the drawings. Although some embodiments of the present application are shown in the drawings, it should be understood that the present application can be implemented in a variety of forms and should not be construed as being limited to the embodiments set forth herein, instead, those embodiments are provided for a more thorough and complete understanding of the present application. It should be understood that the drawings and the embodiments of the present application are intended to be illustrative only and not to limit the protection scope of the present application.

The terms “first”, “second”, “third”, and “fourth”, etc. (if present) in the specification and claims of the embodiments of the present application and the above drawings are used to distinguish similar objects, and they are not necessarily used to describe a particular order or a sequential order. It should be understood that data used in this way can be interchanged as appropriate, so that the embodiments of the present application described herein can be implemented, for example, in a sequence other than those illustrated or described herein. In addition, the terms “comprise” and “include” and any variations thereof are intended to cover a non-exclusive inclusion, for example, a process, a method, a system, a product or a device that comprises a series of steps or units is not necessarily limited to steps or units explicitly listed, but can include other steps or units that are not explicitly listed or inherent to the process, the method, the product or the device.

In a scenario of new retail, such as an unmanned supermarket, a technical difficulty lies in how to judge and keep track of the positions of customers through a plurality of cameras. It is needed to associate the customers with the goods they take and acquire the positions of the customers continuously during the entire shopping process. At present, a method for determining the positions of the human body mainly positions based on two-dimensional positions of the human body and/or the limbs detected and acquired by a pre-trained detection model from image. However, the determination of the above two-dimensional positions are heavily dependent on the accuracy of the model, and it is easy to cause inaccurate two-dimensional position detection when a false detection occurs or the target object is shielded by other objects, thereby resulting in a problem of positioning failure or inaccurate positioning.

In view of the above problem existing in the prior art, an embodiment of the present application provides an image-based position detection method. The method is based on two-dimensional positions of a target object in a plurality of images, where the plurality of images are captured by a plurality of photographing devices in different orientations at the same time, and then in combination with internal parameters and external parameters of a plurality of photographing devices, a three-dimensional position of the target object is determined. Therefore, even if the target object is shielded by other objects in a certain image, an accurate three-dimensional position can still be obtained according to the target object’s two-dimensional positions in other images. Moreover, the method for determining the three-dimensional position based on a plurality of images can also avoid the problem of inaccurate positioning of the three-dimensional position caused by inaccurate identification of a two-dimensional position in a single image, thereby improving the accuracy and reliability of the positioning of the object.

The technical solutions of embodiments of the present application will be described in detail below with reference to the drawings.

FIG. 1 is a flowchart of an image-based position detection method according to an embodiment of the present application. The method may be performed by an image-based position detection apparatus (hereinafter referred to as a position detection apparatus). Referring to FIG. 1, the method includes steps S11 to S13:

S11: acquiring images captured by a plurality of photographing devices mounted in different orientations, where the images are captured at the same time and where the plurality of photographing devices are synchronous in time.

In the embodiment, the plurality of photographing devices mentioned can aim at a same calibration object or at different calibration objects respectively, and the position, orientation and photographing angle of each photographing device can be configured according to requirements. In addition, the plurality of photographing devices may be synchronous in time by reading network time or by receiving synchronization signals sent by a specific apparatus, which are not specifically limited in the embodiment.

The images captured by the capturing device in the embodiment are RGB images or depth images.

S12: detecting a two-dimensional position of a target object in each of the images.

The target object in the embodiment may be a human body, or other living organisms or subjects.

In the embodiment, when detecting the two-dimensional position of the target object in each image, at least one of the following methods may be adopted.

In a possible method, key points of the target object in each image may be detected based on a preset key point detection model, and a distribution region of the target object’s key points in each image is determined as the two-dimensional position of the target object in each image. Preferably, the above key point detection model may be a neural network model obtained through pre-training. The key points in the embodiment may be any point on the target object. For example, when the target object is a person, the key point may be a point on the human hand, a point on the arm, a point on the leg, etc., but not limited to points at these positions.

In another possible method, different parts of the target object (e.g., the body and head of the human body, etc.) may be detected based on a preset limb detection model. The two-dimensional position of each part of the target object in each image is determined, and the two-dimensional position of the target object as a whole in each image is determined based on the two-dimensional position of each part of the target object in each image.

In another possible method, different parts of the target object (e.g., body and head of the human body, etc.) may be detected based on a preset limb detection model. The two-dimensional position of each part of the target object in each image is determined, and the two-dimensional position of the target object as a whole in each image is determined based on the two-dimensional position of each part of the target object in each image.

In yet another possible method, it is also possible to perform a key point detection in the image and also perform a detection for each part of the target object in the image. For instance, in one possible method, each part of the target object may be detected firstly in each image to obtain the two-dimensional position of each part of the target object in each image, and an approximate regional position of the target object as a whole in each image is determined based on the two-dimensional position of each part of the target object in each image. Further, the key point detection is performed in the above approximate regional position, and the accurate two-dimensional position of the target object in each image is determined based on the detection results of both. This method can not only avoid the problem of inaccurate positioning caused by a missed detection or a misdetection of the key points, but also can reduce the calculation amount of the key point detection and improve the detection efficiency. In another possible method, the key point detection and the detection of each part of the target object can be performed simultaneously in each image. The two-dimensional position of the target object in each image is determined comprehensively based on the distribution region of the key points on the target object in each image and the region where the parts of the target object are located, thereby eliminating the interference of the key point misdetection or missed detection in determining the position of the first region.

In still another possible method, the two-dimensional position of the target object in each image may be detected based on a preset edge detection method.

S13: determining a three-dimensional position of the target object in an actual space based on the two-dimensional position of the target object in each image and internal parameters and external parameters of the plurality of photographing devices.

The internal parameter of the photographing device in the embodiment includes, but are not limited to, a focal length, a field of view (FOV) and a resolution. The external parameter of the photographing device in the embodiment includes, but are not limited to, a coordinate position, an orientation and a pitch angle.

When the two-dimensional position of the target object in each image is known, the three-dimensional position of the target object in the actual space can be obtained based the internal parameter and the external parameter of each photographing device using the existing geometric theory.

Similarly, when the three-dimensional position of the target object in the actual space is acquired, if the target object is shielded by other objects in an above image captured, the two-dimensional positions of the target object in the image cannot be determined directly, the position of the target object in the image may be inversely determined based on the three-dimensional position of the target object and the internal parameter and the external parameter of the photographing device when the image is captured. In that case, even if the target object is shielded by other objects in the image, it is possible to calculate the position of the target object in the image according to the actual three-dimensional position of target object, thereby solving the problem that the target object cannot be located when being shielded in the image. Alternatively, when the three-dimensional position of the target object is acquired, the two-dimensional position of the target object in each image may be corrected based on the internal parameter and the external parameter of each photographing device using the geometric theory, thereby improving the accuracy of the two-dimensional position location.

The embodiment acquires images captured at the same time by a plurality of photographing devices mounted in different orientations, detects a two-dimensional position of a target object in each image, and determines a three-dimensional position of the target object in an actual space based on the two-dimensional position of the target object in each image and internal parameters and external parameters of the plurality of photographing devices. Since the embodiment determines the three-dimensional position of the target object in the actual space by combining the two-dimensional positions of the target object in a plurality of images, even if the target object is shielded by other objects in a certain image, an accurate three-dimensional position can still be obtained according to the target object's two-dimensional positions in the other images. Moreover, the method for determining the three-dimensional position based on a plurality of images can also avoid the problem of inaccurate positioning of the three-dimensional position caused by inaccurate identification of a two-dimensional position in a single image, thereby improving the accuracy and reliability of the positioning of the object.

The above embodiment is further optimized and expanded in conjunction with the drawings.

Figure 2:
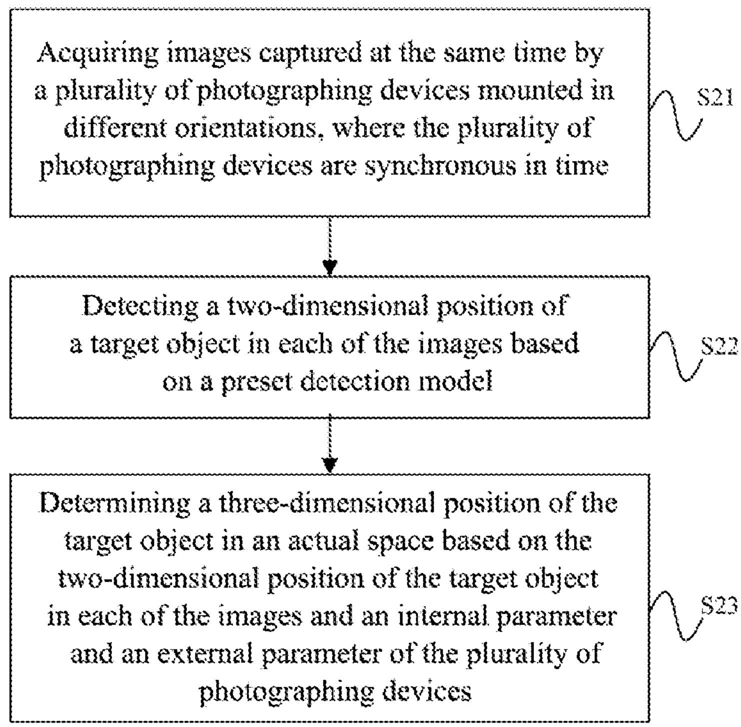
FIG. 2 is a flowchart of an image-based position detection method according to an embodiment of the present application.

FIG. 2 is a flowchart of an image-based position detection method according to an embodiment of the present application. As shown in FIG. 2, on the basis of the embodiment in FIG. 1, the method includes steps S21 to S23:

S21: acquiring images captured at the same time by a plurality of photographing devices mounted in different orientations, where the plurality of photographing devices are synchronous in time.

S22: detecting the two-dimensional position of the target object in each image based on a preset detection model.

For example, the detecting module in the embodiment may be a neural network model obtained through being pre-trained, and this neural network model may be used to detect the position of each part of the target object. When the position of each part of the target object in each image is obtained, the region of each part of the target object in each image is connected in series to acquire the two-dimensional position of the target object as a whole in each image. That is to say, the embodiment may detect the positional region of each part of the target object in each image based on the preset model, and determine the two-dimensional position of the target object as a whole based on the two-dimensional position of each part of the target object in each image.

In order to improve the accuracy of the above detection model, different network layers in the model can be trained to detect different parts of the target object during model training. For example, the lower layer of the network layer in the model can be trained to detect a smaller part of the target object, and the higher layer of the network layer in the model can be trained to detect a relatively larger part of the target object.

Of course, the above examples are only for the purpose of clearly explaining the technical solution of the embodiment, and are not intended to limit the present application.

S23: determining a three-dimensional position of the target object in the actual space based on the two-dimensional position of the target object in each image and internal parameters and external parameters of the plurality of photographing devices.

The embodiment detects the two-dimensional position of the target object in each image by a preset detection module, and determines the three-dimensional position of the target object in the actual space based on the two-dimensional position of the target object in each image and the internal parameter and the external parameter of each photographing device. The method can improve the efficiency and accuracy of the recognition of the two-dimensional positions of target object, and meanwhile, the technical solution of the embodiment determines the three-dimensional position of the target object in the actual space based on two-dimensional positions of the target object in the plurality of images, and thus can solve the problem that the target object cannot be accurately positioned if the target object is shielded in the image, existing in the positioning based on a single image.

Figure 3:
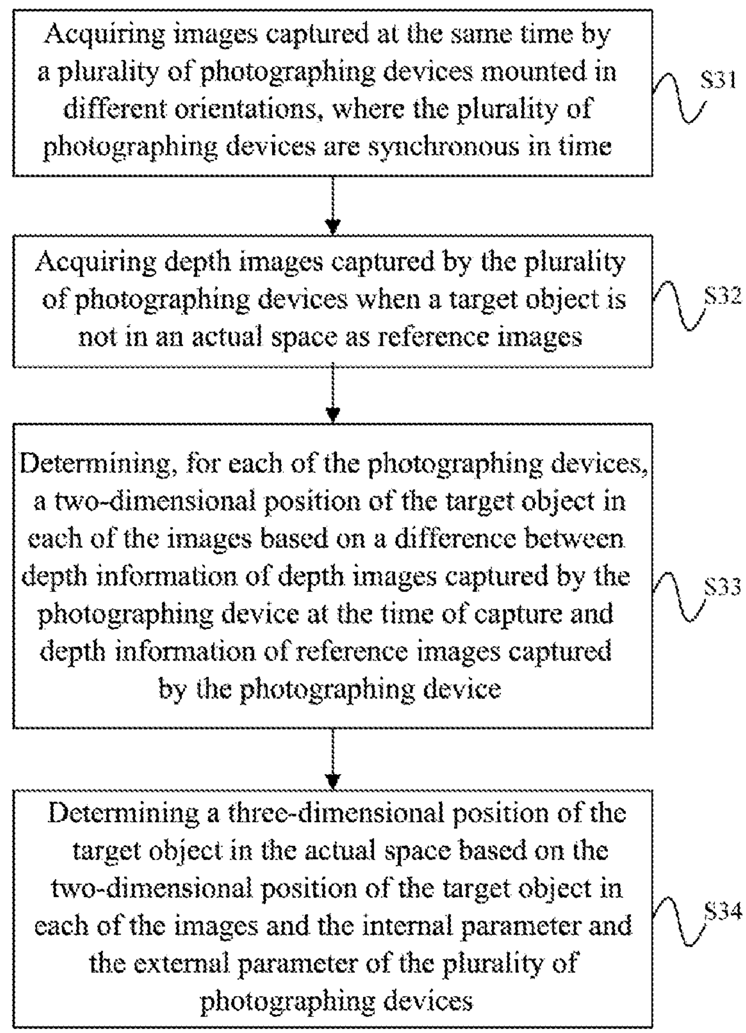
FIG. 3 is a flowchart of an image-based position detection method according to an embodiment of the present application.

FIG. 3 is a flowchart of an image-based position detection method according to an embodiment of the present application. As shown in FIG. 3, on the basis of the embodiment in FIG. 1, the method includes steps S31 to S34:

S31: acquiring images captured at the same time by a plurality of photographing devices mounted in different orientations, where the plurality of photographing devices are synchronous in time.

S32: acquiring depth images captured by the plurality of photographing devices when the target object is not in the actual space as reference images.

S33: determining, for each of the photographing devices, a two-dimensional position of the target object in each of the images based on a difference between depth information of depth images captured by the photographing device at the time of capturing and depth information of reference images captured by the photographing device.

S34: determining a three-dimensional position of the target object in the actual space based on the two-dimensional position of the target object in each of the images and internal parameters and external parameters of the plurality of photographing devices.

The photographing device in the embodiment may be a depth camera, and the images captured by the photographing device are depth images.

Assuming that the target object is a human body, the depth images including the human body captured by the photographing device. The images without a human body in the scene captured by the photographing device are acquired firstly. Since the depth information of the image when human body is included in a scene is different from the depth information of the image when human body is not included in the same scene, the two-dimensional region of the human body in the image can be determined according to the difference between the depth information two images. Further, the three-dimensional position of the human body in the actual scene can be obtained based on the two-dimensional regions of the human body in a plurality of images and the internal parameter and the external parameter of each photographing device by using a geometric method.

Of course, the above examples are merely illustrative examples based on human beings, and are not intended limit the present application, in fact, the above methods are applicable to any object including human beings.

The embodiment acquires depth images captured at the same time by a plurality of photographing devices located in different orientations, and reference images captured by a plurality of photographing devices, and the embodiment determines a two-dimensional position of the target object in each depth image based on the difference between the depth information of each depth image and the depth information of the corresponding reference image, thereby improving accuracy in the location of the two-dimensional position of the target object, and providing a guarantee for the location of the three-dimensional position of the target object.

Figure 4:
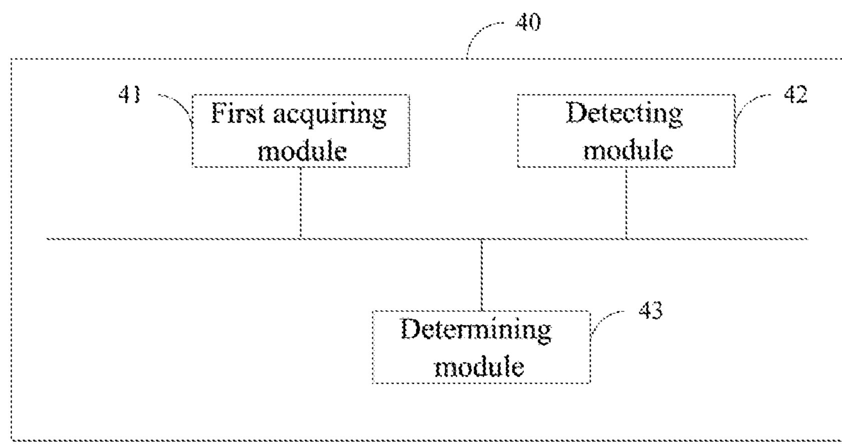
FIG. 4 is a schematic structural diagram of an image-based position detection apparatus according to an embodiment of the present application.

FIG. 4 is a schematic structural diagram of an image-based position detection apparatus according to an embodiment of the present application. As shown in FIG. 4, the apparatus 40 includes:

a first acquiring module 41, configured to acquire images captured at a same time by a plurality of photographing devices mounted in different orientations, where the plurality of photographing devices are synchronous in time;

a detecting module 42, configured to detect a two-dimensional position of a target object in each of the image;

a determining module 43, configured to determine a three-dimensional position of the target object in an actual space based on the two-dimensional position of the target object in each of the images as well as internal parameters and external parameters of the plurality of photographing devices.

In one possible design, the images include depth images.

In another possible design, the apparatus further includes:

a correcting module, configured to correct the two-dimensional position of the target object in the images captured by each of the photographing devices based on the three-dimensional position of the target object in the actual space and the external parameter and the internal parameter of each of the photographing device.

The apparatus according to the embodiment can be used to perform the method in the embodiment of FIG. 1, and the execution manner and the beneficial effects are similar, which will not be described herein again.

Figure 5:
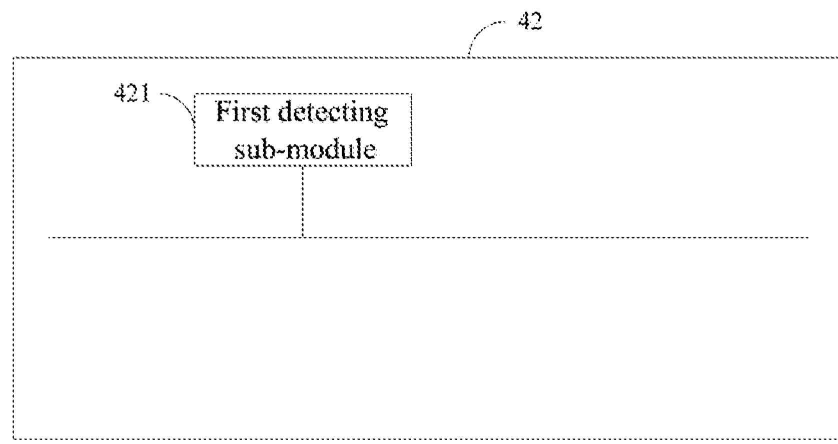
FIG. 5 is a schematic structural diagram of a detecting module 42 according to an embodiment of the present application.

FIG. 5 is a schematic structural diagram of a detecting module 42 according to an embodiment of the present application. As shown in FIG. 5, on the basis of the embodiment in FIG. 4, the detecting module 42 includes:

a first detecting sub-module 421, configured to detect the two-dimensional position of the target object in each of the images based on a preset detection model.

In one possible design, the first detecting sub-module 421 is specifically configured:

detect a two-dimensional position of each part of the target object in each of the images based on the preset detection model; and determine the two-dimensional position of the target object as a whole in each of the images based on the two-dimensional position of each part of the target object in each of the images.

The apparatus according to the embodiment can be used to perform the method in the embodiment of FIG. 2, and the execution manner and the beneficial effects are similar, which will not be described herein again.

Figure 6:
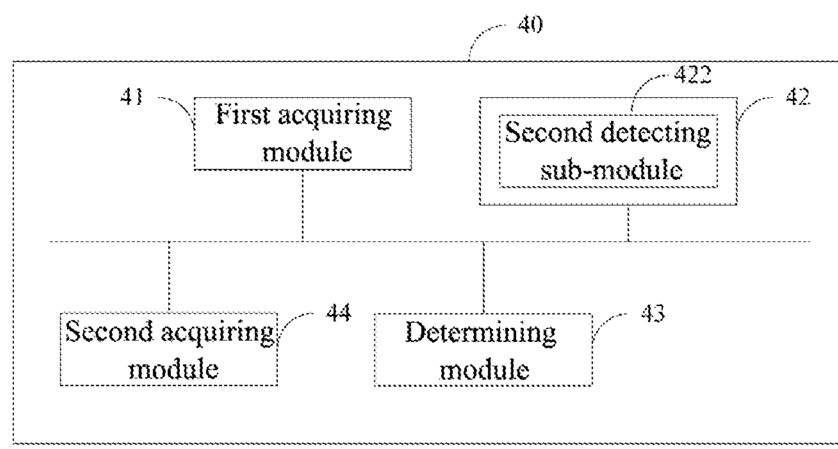
FIG. 6 is a schematic structural diagram of an image-based position detection apparatus according to an embodiment of the present application.

FIG. 6 is a schematic structural diagram of an image-based position detection apparatus according to an embodiment of the present application. As shown in FIG. 6, on the basis of the embodiment in FIG. 4, the apparatus 40 further includes:

a second detecting module 44, configured to acquire depth images captured by the plurality of photographing devices when the target object is not in the actual space as reference images.

The detecting module 42 includes:

a second detecting sub-module 422, configured to determine, for each photographing device, the two-dimensional position of the target object in each of the images based on a difference between depth information of depth images captured by the photographing device at the time of capture and depth information of reference images captured by the photographing device.

The apparatus according to the embodiment can be used to perform the method in the embodiment of FIG. 3, and the execution manner and the beneficial effects are similar, which will not be described herein again.

An embodiment of the present application further provides a computer device, including: one or more processors; and a storage apparatus, configured to store one or more programs, where the one or more programs, when executed by the one or more processors, cause the one or more processors to implement the method according to any one of the above embodiments An embodiment of the present application further provides a computer readable storage medium, having a computer program stored thereon, where the program, when executed by a processor, implements the method according to any one of the above embodiments.

The functions described above herein can be performed at least partially by one or more hardware logic components. For example, without limitation, exemplary types of hardware logic components that can be used include: field programmable gate array (FPGA), application specific integrated circuit (ASIC), application specific standard product (ASSP), system on chip (SOC), load programmable logic device (CPLD), etc.

Program codes for implementing the methods of the disclosure can be written in any combination of one or more programming languages. Those program codes can be provided to a processor or a controller of a general purpose computer, a special purpose computer or other programmable data processing apparatuses, so that when the program codes are executed by the processor or the controller, the functions/operations specified in the flowcharts and/or block diagrams are implemented. The program codes can be executed entirely on a machine, executed partly on the machine, and executed, as separate software package, partly on the machine and partly on a remote machine or executed entirely on the remote machine or a server.

In the context of the disclosure, a machine-readable medium can be a tangible medium that can contain or store a program for being used by or used in combination with an instruction execution system, an apparatus or a device. The machine readable medium can be a machine-readable signal medium or a machine-readable storage medium. The machine-readable medium can include, but is not limited to, an electronic, a magnetic, an optical, an electromagnetic, an infrared, or a semiconductor system, apparatus, or device, or any suitable combination of the foregoing. More specific examples of machine-readable medium will include an electrical connection based on one or more wires, a portable computer disk, a hard disk, a random access memory (RAM), a read only memory (ROM), an erasable programmable read only memory (EPROM or a flash memory), optical fibers, a compact disk read only memory (CD-ROM), an optical storage device, a magnetic storage device, or any suitable combination of the foregoing.

In addition, although the operations are depicted in a particular order, it should be understood that such operations are required to be performed in the particular order illustrated or in a sequential order, or all illustrated operations are required to be performed to achieve desired results. Multitasking and parallel processing can be advantageous in certain situations. Likewise, although several specific implementation details are included in the above discussion, those details should not be understood as limiting the scope of the disclosure. Various features described in the context of separate embodiments can also be implemented in combination in a single implementation. On the contrary, various features described in the context of a single implementation can also be implemented in a plurality of implementations either individually or in any suitable sub-combination.

Although the subject matter has been described in language specific to structural features and/or methodological actions, it is understood that the subject matter defined in the appended claims is not necessarily limited to the specific features and actions described above. On the contrary, the specific features and actions described above are only exemplary forms for implementing the claims.

What is claimed is:

1. An image-based position detection method, comprising:

acquiring images captured at a same time by a plurality of photographing devices mounted in different orientations, wherein the plurality of photographing devices are synchronous in time;

detecting a two-dimensional position of a target object in each of the images;

determining a three-dimensional position of the target object in an actual space based on the two-dimensional position of the target object in each of the images and internal parameters and external parameters of the plurality of photographing devices; and correcting the two-dimensional position of the target object in the images captured by each of the photographing devices based on the three-dimensional position of the target object in the actual space and the external parameter and the internal parameter of each of the photographing devices using a geometric theory.

2. The method according to claim 1, wherein the detecting a two-dimensional position of a target object in each of the images comprises:

detecting the two-dimensional position of the target object in each of the images based on a preset detection model.

3. The method according to claim 2, wherein the detecting the two-dimensional position of the target object in each of the images based on a preset detection model comprises:

detecting a two-dimensional position of each part of the target object in each of the images based on the preset detecting model; and determining the two-dimensional position of the target object as a whole in each of the images based on the two-dimensional position of each part of the target object in each of the images.

4. The method according to claim 1, wherein the images comprise depth images.

5. The method according to claim 4, wherein before the detecting a two-dimensional position of a target object in each of the images, the method further comprises:

acquiring the depth images captured by the plurality of photographing devices when the target object is not in the actual space as reference images;

the detecting a two-dimensional position of a target object in each of the images comprises:

determining, for each of the photographing devices, the two-dimensional position of the target object in each of the images based on a difference between depth information of a depth image captured by the photographing device at the time of capture and depth information of a reference image captured by the photographing device.

6. The method according to claim 1, wherein the method further comprises:

determining, based on the three-dimensional position of the target object in the actual space and the internal parameter and the external parameter of each of the photographing devices, the two-dimensional positions of the target object in images in which the target object is shielded by other objects.

7. The method according to claim 1, wherein the internal parameter of each of the photographing devices comprises at least one of a focal length, a field of view and a resolution, and the external parameter of each of the photographing devices comprises at least one of a coordinate position, an orientation and a pitch angle.

8. A non-transitory computer readable storage medium, having a computer program stored thereon, wherein the program, when executed by a processor, implements the method according to claim 1.

9. An image-based position detection apparatus, comprising:

one or more processors; and a storage apparatus, configured to store one or more programs, wherein the one or more programs, when executed by the one or more processors, cause the one or more processors to:

acquire images captured at a same time by a plurality of photographing devices mounted in different orientations, wherein the plurality of photographing devices are synchronous in time;

detect a two-dimensional position of a target object in each of the images;

determine a three-dimensional position of the target object in an actual space based on the two-dimensional position of the target object in each of the images and internal parameters and external parameters of the plurality of photographing devices; and correct the two-dimensional position of the target object in the images captured by each of the photographing devices based on the three-dimensional position of the target object in the actual space and the external parameter and the internal parameter of each of the photographing devices using a geometric theory.

10. The apparatus according to claim 9, wherein the one or more programs further cause the processor to:

detect the two-dimensional position of the target object in each of the images based on a preset detection model.

11. The apparatus according to claim 10, wherein the one or more programs further cause the processor to:

detect a two-dimensional position of each part of the target object in each of the images based on the preset detection model; and determine the two-dimensional position of the target object as a whole in each of the images based on the two-dimensional position of each part of the target object in each of the images.

12. The apparatus according to according to claim 9, wherein the images comprise depth images.

13. The apparatus according to according to claim 12, wherein the one or more programs further cause the processor to:

acquire the depth images captured by the plurality of photographing devices when the target object is not in the actual space as reference images; and determine, for each of the photographing devices, the two-dimensional position of the target object in each of the images based on a difference between depth information of a depth image captured by the photographing device at the time of capture and depth information of a reference image captured by the photographing device.

14. The apparatus according to claim 9, wherein the one or more programs further cause the processor to:

determine, based on the three-dimensional position of the target object in the actual space and the internal parameter and the external parameter of each of the photographing devices, the two-dimensional positions of the target object in images in which the target object is shielded by other objects.

15. The apparatus according to claim 9, wherein the internal parameter of each of the photographing devices comprises at least one of a focal length, a field of view and a resolution, and the external parameter of each of the photographing devices comprises at least one of a coordinate position, an orientation and a pitch angle.

* * * * *